Figure 1:
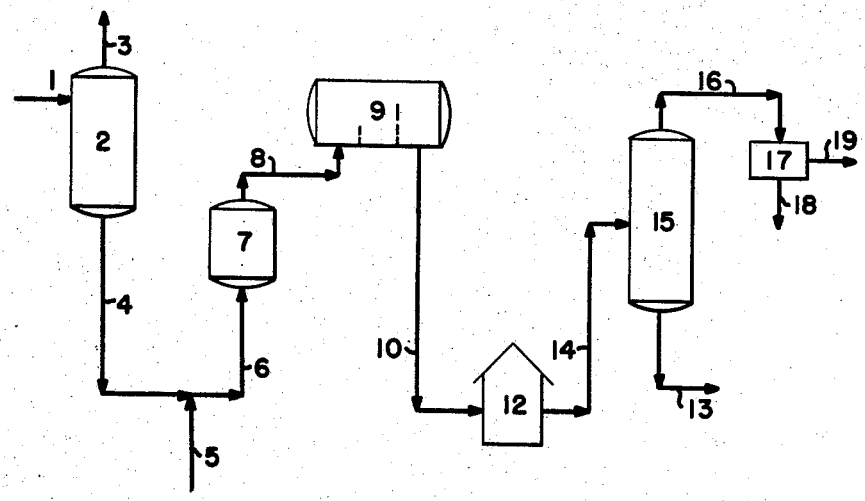

June 22, 1965   S. LIPTON ET AL   3,190,846
PREPARATION OF A LATEX OF REDUCED PARTICLE SIZE
Filed Aug. 10, 1959   2 Sheets-Sheet 1

Sydney Lipton
Myron W. Belaga      Inventors
Roland Timothy Kelley

By C. D. Stores   Patent Attorney

United States Patent Office 3,190,846
Patented June 22, 1965

3,190,846
PREPARATION OF A LATEX OF REDUCED
PARTICLE SIZE
Sydney Lipton, Bayonne, and Myron W. Belaga, Cranford, N.J., and Roland Timothy Kelley, Baton Rouge, La., assignors to Esso Research and Engineering Company, a corporation of Delaware
Filed Aug. 10, 1959, Ser. No. 832,827
2 Claims. (Cl. 260—29.7)

This invention relates to a process for preparing an improved rubbery latex, and more particularly it is concerned with an apparatus for providing a surge system.

It is known to prepare a butyl rubber polymer in a hydrocarbon solvent and to form latex therefrom by dispersing the rubbery solution in an emulsifier solution. In the past, the latex was prepared in a two-stage homogenization system. The first stage was a dispersator mixer; the second stage was a series of rapisonic nozzles and surge capacity was required between the two stages. Furthermore, the average particle size of the resulting latex was usually relatively high, above one micron. It might have been possible to reduce the size by a conventional recycling procedure; however, the internal stability would be relatively poor, and this is certainly undesirable in a continuous operation.

It has now been discovered that the surge capacity and recycle operation can be combined and the average particle size of the rubbery latex may be reduced by incorporating a surge drum system in the process. Thus in accordance with one embodiment of this invention, a rubbery solution is prepared comprising butyl rubber dissolved in a solvent such as hexane. This solution is dispersed in water with an emulsifying agent therein. The dispersion is passed through a high speed mixing zone such as a dispersator. The crude latex effluent therefrom is then introduced to a surge drum zone wherein a recycle, e.g., 2 to 1 is employed to form colloidal particles with an average particle size of about 0.5 micron and a particle size range preferably between 0.01 and 1.5 microns. This latex is subsequently stored and stripped to provide the final end product.

The butyl rubber polymer in this invention is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene.

Mixture of monomers, preferably with 1 to 5 volumes of inert diluene, e.g., methyl chloride, should be cooled to a temperature between 0 and —200° C. and it is preferred that the temperature range be between —60° and —130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, when recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128. A halogenated derivative of butyl rubber, e.g., chlorinated or brominated butyl rubber is within the purview of this invention. The preferred range of halogen in the rubber structure is from 0.9 to 1.5 weight percent for chlorinated butyl rubber and 1.5 to 3.0 weight percent for brominated butyl rubber. A polydiolefin rubber and tri- or tetra-polymers of isobutylene may be applicable to this invention.

Figure 3:
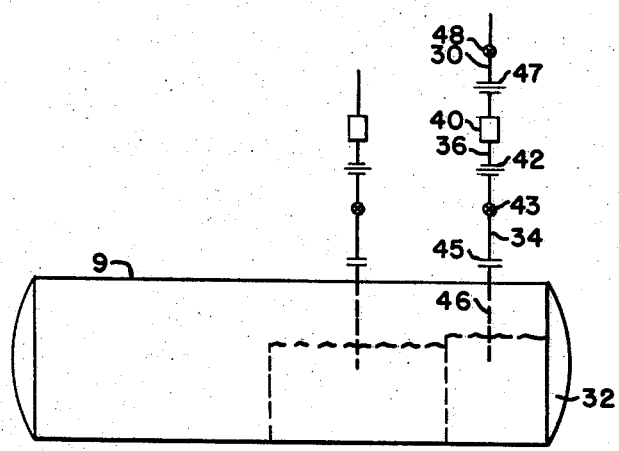
Figure 2:
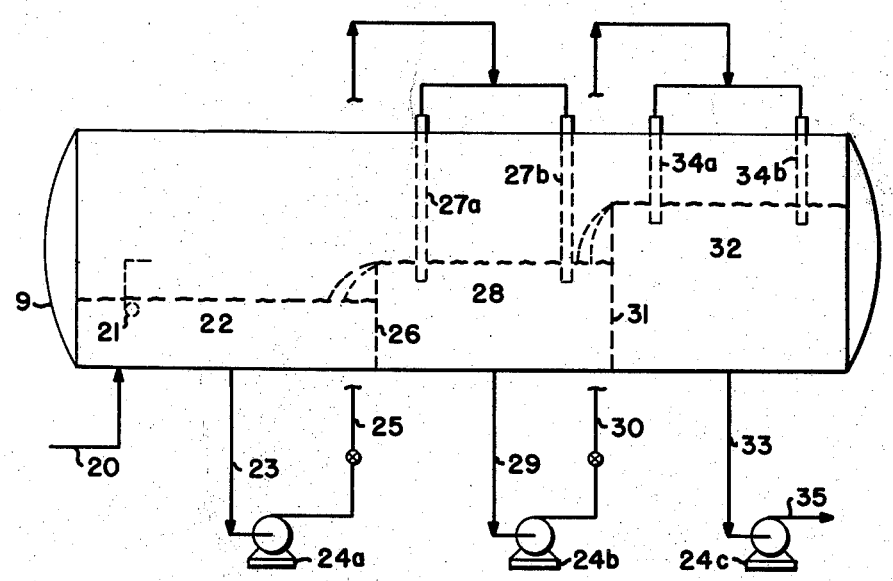

This invention may be understood from the following description in conjunction with the accompanying drawings in which FIGURE 1 shows the over-all process for preparing an improved rubbery latex. FIGURE 2 demonstrates the apparatus for the surge drum zone with the rapisonic nozzles therein. FIGURE 3 provides a detailed illustration of the rapisonic nozzle device.

Referring now to FIGURE 1, the butyl rubber cement is introduced into cement stripping zone 2 through line 1. This cement generally comprises 14 to 20 weight percent of a rubbery polymer in an over-all hydrocarbon-polymer solution. The solvent is preferably a $C_5$ to $C_9$ aliphatic hydrocarbon with a boiling point above 175° F. The preferred solvent is hexane. Hexane is withdrawn through line 3 from the top of stripping zone 2 and a concentrated cement is withdrawn from the bottom portion by means of line 4. This concentrated cement generally comprises 21 to 30 weight percent of a rubbery polymer in an overall hydrocarbon-polymer solution. An emulsifying system is introduced to the process through line 5 to provide 200 to 500 parts of water per 100 parts of rubber (phr.). The water which is transported in line 5 contains emulsifiers ranging from 3 to 7 parts phr. Emulsifying agents (surface active agents) found suitable for the improved process of the present invention are any of those disclosed in Industrial and Engineering Chemistry for January 1939, pages 66–69; January 1941, pages 16–22; January 1943, pages 126–130, and any modifications thereof. Preferred emulsifiers are alkali metal, alkaline earth, ammonium or amine salts of organic sulfates having about 8 to 14 carbon atoms, and preferably about 10 to 14 carbon atoms. Emulsifiers having 12 to 14 carbon atoms are especially desirable; and generally they are aliphatic and saturated, although unsaturated aliphatic and cyclic derivatives may be used. Furthermore, the use of relatively small quantities of a hydrogen ortho-phosphate salt increases the mechanical and processing stability of these emulsions. It has been found that about 0.25 to about 2 parts of the phosphate p.h.r. are suitable for the production of these highly stabilized emulsions, but it is preferred to use about 0.5 to about 1.5 phr. of the stabilizer. The combination of the butyl rubber cement and emulsifying system is transported to dispersator 7 by means of line 6. The purpose of this dispersator 7 is to intimately mix the water, emulsifying agent and rubber to form a crude latex mixture. The average particle size of this latex mixture is greater than 1 micron. The mixture from dispersator 7, a crude latex effluent, is subsequently transported through line 8 and introduced to surge drum 9. This drum provides a minimum recycle of 2 to 1 and a latex is formed therein which has an average particle size of less than 1 micron. The latex is then withdrawn through line 10 and introduced to storage tank 12 where it remains for about one day to provide stripping surge capacity. The latex is subsequently transported through line 14 to latex stripper 15 wherein the concentration of the product is increased. The concentrated latex therefrom is withdrawn through line 13. Solvent, e.g., hexane, and water are transported through line 16 to an overhead receiver drum 17 to provide a hexane stream 19 and a water stream 18.

FIGURE 2 is representative of the surge drum zone. Surge drum 9 is a container for receiving the dispersion from the dispersator. Secured to the bottom surface of the surge drum 9 are two vertically disposed weirs 26 and 31 in spaced relation that divide the drum transversely into three sections which are the surge section or feed zone 22, the first stage section or reservoir 28, and the second stage section or reservoir 32. The height of weir 31 is larger than weir 26. Therefore, each of the three sections of the drum has a different liquid level therein. At the bottom of the surge section 22 is provided an inlet means 20 for the crude latex. An outlet means 23 is also located in the bottom portion of the surge section and the latex, which is withdrawn, is transported by means of pump 24a to rapisonic nozzles 27a and 27b. One or more nozzle means are disposed in the top of the first stage section 28 to introduce the latex from the surge section 22 to a point below the liquid level in the first stage section 28. The flow rates through nozzles 27a and 27b are slightly higher than the crude latex flow rate in inlet means 20. This provides the first pass through a set of rapisonic nozzles. An outlet means 29 is disposed at the bottom portion of the first stage section 28, and the latex is transported by means of pump 24b to rapisonic nozzles 34a and 34b. One or more nozzle means are disposed in the top of the second stage section 32 to introduce latex at a point below the liquid level therein. The flow rates through nozzle 34a and 34b are about the same as the corresponding flow rates through nozzles 27a and 27b. The outlet flow through 33 is less than the flow through line 25 or line 30. As a result the excess flow returns to the first stage section 28 over weir 31 and subsequently to surge section 22 over weir 26. Flow through line 25 and line 30 must be greater than the crude latex inlet flow and the product outlet flow. The latex withdrawn from second stage section 32 by means of outlet 33 is transported by pump means 24c to a storage tank. This design provides a minimum of two passes through a set of nozzles. An abnormal condition is discovered by an electrical alarm means 21 in surge section 22. A minimum amount of instrumentation is required to control the operation in the surge drum zone.

Referring now to FIGURE 3, this drawing shows the detailed apparatus for a rapisonic nozzle 34 in surge drum 9. The latex is transported by conduit means 30 which communicates with nozzle means 40 through valve 48 and union 47. The latex from the nozzle passes through union 42. Unions 42 and 47 permit removal of nozzle 40 from operation when valve 43 and valve 48 are closed. Other nozzles such as rapisonic nozzle 34a can remain in operation. Line 30 communicates with 45 which is a flange mounting to support conduit means 46 wherein the latex is introduced below the level of the liquid in the second stage section 32.

Thus in accordance with this invention, it is now possible to provide a homogeneous rubbery latex in which the average particle size is less than 1 micron, preferably about 0.5 micron, with a particle size between 0.01 and 1.5 microns. This new latex can now be used in coating materials, in films, in a filmed layer between paper as a laminate and in paper as a filling material. Furthermore, the instrumentation and reverse cascade flow features permit the variance of the recycle per stage over a wide range but the internal stability of the system is maintained.

The following example is submitted to illustrate but not to limit this invention:

*Example 1*

A rubbery polymer was prepared comprising 98.8% isobutylene with 1.2% isoprene. A feed was introduced to the cement stripper with the rubbery copolymer as a 19 weight percent component of a rubber-hydrocarbon solution with hexane as the solvent. A concentrated cement was withdrawn from the stripper with the rubbery polymer as a 23 weight percent component of the solution.

An emulsifying system was prepared comprising 5 parts of Alipal CO-433, 330 parts of water, and 100 parts of rubber. This combination of rubbery cement and emulsifying system was subsequently passed through a dispersator and then introduced to a surge drum at a flow rate of 40 g.p.m. The flow rate through the first set of nozzles was 50 g.p.m. and the rate through the second set of nozzles was also 50 g.p.m. which provides a recycle of 2 to 1. The latex was withdrawn from the surge drum and after one day in storage was transported to a latex stripper; this latex comprised 100 parts of rubber, 385 parts of hexane and 295 parts of water. A concentrated latex was withdrawn from the stripper which comprised 100 parts of rubber and 87 parts of water. The average particle size of this end product was about 0.5 micron.

Having set forth the general nature and embodiments of the present invention, the true scope is particularly pointed out in the appended claims.

What is claimed is:

1. A process for preparing a latex having reduced particle size from a polymer chosen from the group consisting of a copolymer of 70–99.5 wt. percent of a $C_4$ to $C_7$ isoolefin with 30–0.5 wt. percent of a $C_4$ to $C_{10}$ multiolefin and its bromination and chlorination products which comprises:
   (1) preparing a solution of said polymer dissolved in a liquid hydrocarbon solvent,
   (2) dispersing said solution in water as the continuous phase in the presence of an emulsifier to form a latex having a large initial particle size,
   (3) passing said latex to a feed zone,
   (4) withdrawing said latex from the bottom of said feed zone,
   (5) homogenizing said withdrawn latex and introducing it into the first of a plurality of adjacent reservoirs,
   (6) returning latex from the upper portion of said first reservoir to said feed zone,
   (7) successively repeating said process steps throughout said plurality of reservoirs by
      (a) withdrawing latex from the bottom of each immediately preceding reservoir, homogenizing said withdrawn latex and introducing it into the next subsequent reservoir,
      (b) returning latex from the upper portion of said subsequent reservoir to said immediately preceding reservoir,
   (8) withdrawing latex from the bottom of the last of said plurality of reservoirs and
   (9) stripping solvent from said last withdrawn latex to form a dispersion of said polymer in water, said polymer having a reduced particle size.

2. The process according to claim 1 in which the emulsifying agent is a salt of organic sulfates having about 8 to 14 carbon atoms selected from the group consisting of alkali metal, alkaline earth, ammonium, and amine.

References Cited by the Examiner

UNITED STATES PATENTS

| | | | |
|---|---|---|---|
| 2,357,861 | 9/44 | Willson | 260—29.7 |
| 2,794,711 | 6/57 | Hall et al. | 23—270.5 |
| 2,799,662 | 7/57 | Ernst et al. | 260—29.7 |
| 2,897,168 | 7/59 | Brown | 260—29.7 |
| 2,903,344 | 9/59 | Rollman et al. | 23—285 |
| 2,947,715 | 8/60 | Charlet et al. | 260—29.7 |

MURRAY TILLMAN, *Primary Examiner.*

D. ARNOLD, LEON J. BERCOVITZ, WILLIAM H. SHORT, *Examiners.*